United States Patent [19]

Matsuda et al.

[11] Patent Number: 5,145,745
[45] Date of Patent: Sep. 8, 1992

[54] MAGNETIC RECORDING MEDIUM COMPRISING PLURAL MAGNETIC LAYERS WHEREIN EACH LAYER HAS SPECIFIED LOSS-MODULUS PROPERTIES

[75] Inventors: Atsuko Matsuda; Tsutomu Kenpo, both of Hino, Japan

[73] Assignee: Konica Corporation, Tokyo, Japan

[21] Appl. No.: 588,690

[22] Filed: Sep. 26, 1990

[30] Foreign Application Priority Data

Oct. 3, 1989 [JP] Japan .................... 1-258606

[51] Int. Cl.$^5$ ............................. G11B 5/00
[52] U.S. Cl. .................. 428/425.9; 428/694; 428/900
[58] Field of Search ............ 428/425.9, 694, 900

[56] References Cited

U.S. PATENT DOCUMENTS

| | | | |
|---|---|---|---|
| 4,741,977 | 5/1988 | Koga et al. | 428/694 |
| 4,812,369 | 3/1989 | Hanai et al. | 428/425.9 |
| 4,857,388 | 8/1989 | Ogawa et al. | 428/212 |
| 4,980,230 | 12/1990 | Saito et al. | 428/329 |

OTHER PUBLICATIONS

"Polymer Chemistry" by Malcolm P. Stevens, Oxford Univ. Press 1990, p. 81.

Primary Examiner—Paul J. Thibodeau
Assistant Examiner—Stevan A. Resan
Attorney, Agent, or Firm—Jordan B. Bierman

[57] ABSTRACT

A magnetic recording medium having superior electromagnetic conversion characteristics and travel durability in a well balanced state. The recording medium comprises a non-magnetic support and a plurality of magnetic layers each comprising a ferromagnetic powder and a binder and each of the magnetic layers shows a peak of its loss modulus at a temperature not less than 50° C. and the half-width of the loss modulus-temperature curve showing the peak of loss modulus is not larger than 20° C.; and the temperature of the peak of loss modulas of the outermost magnetic layer provided at the outermost portion among the magnetic layers is higher than that of a magnetic layer other than the outermost magnetic layer.

5 Claims, 1 Drawing Sheet

MAGNETIC RECORDING MEDIUM COMPRISING PLURAL MAGNETIC LAYERS WHEREIN EACH LAYER HAS SPECIFIED LOSS-MODULUS PROPERTIES

FIELD OF THE INVENTION

The present invention relates to a magnetic recording medium. More particularly, it relates to a magnetic recording medium improved in the dispersibility of a ferromagnetic powder and having superior electromagnetic conversion characteristics and travel durability in a well balanced state.

BACKGROUND OF THE INVENTION

Magnetic recording mediums useful as recording reproducing devices in information processing equipment are required to have high and precise electromagnetic conversion characteristics and to be composed of materials that can promise a good travel performance or durability. In particular, these characteristics are required to be well balanced.

Incidentally, as a means for improving electromagnetic conversion characteristics, it is effective to smooth the surface of a magnetic layer.

For that purpose, mirror finish by applying temperature and pressure can be more readily carried out using as a binder a resin having a low glass transition point (Tg) than using a resin having a high glass transition point.

When, however, this method is applied, the Tg of a coating film itself becomes lower, and hence the travel durability under conditions of high temperature and high humidity tends to be deteriorated.

When a binder with a high Tg is used in order to prevent such deterioration of durability, the Tg of a coating film can be made higher. This, however, tends to result in a lowering of its adhesion to a support or to cause powdering, and hence makes it impossible to improve electromagnetic conversion characteristics.

SUMMARY OF THE INVENTION

An object of the present invention is to provide a magnetic recording medium improved in the dispersibility of a ferromagnetic powder and having superior electromagnetic conversion characteristics and travel durability in a well balanced state.

The object of the present invention can be achieved by a magnetic recording medium comprising a non-magnetic support and, provided thereon, a plurality of magnetic layers each comprising a ferromagnetic powder and a binder; wherein each of magnetic layers shows a peak of its loss modulus at a temperature not less than 50° C. and the half-width of the loss modulus-temperature curve showing the peak of loss modulus is not larger than 20° C., and the temperature of the peak of loss modulus of the outermost magnetic layer provided at the outermost portion among the magnetic layers is higher than that of a magnetic layer other than the outermost magnetic layer.

DETAILED DESCRIPTION OF THE INVENTION

Figure 1:
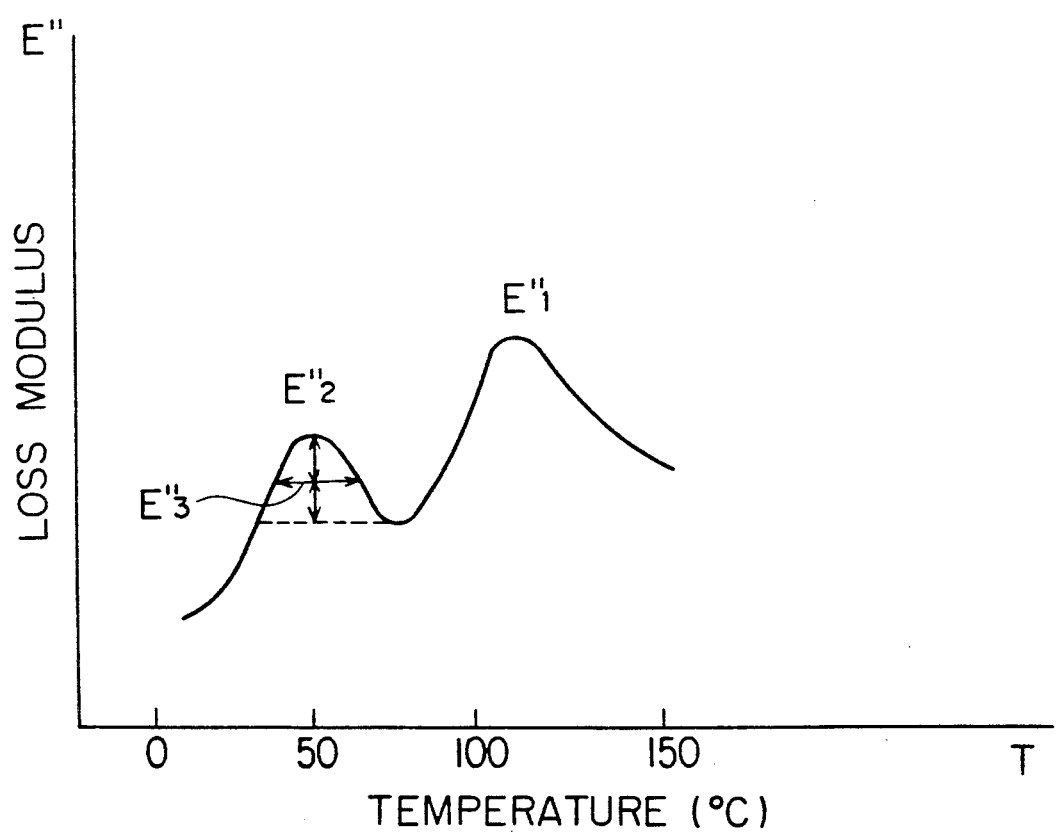
FIG. 1 is a graph to show the relationship between loss modulus and temperature of a magnetic recording medium.

The magnetic recording medium of the present invention will be described in detail separately in respect of a magnetic layer, a non-magnetic support and so forth.

Magnetic layer

The magnetic recording medium comprises a non-magnetic magnetic support and provided thereon a plurality of magnetic layers in which a ferromagnetic powder is dispersed in a binder or the like.

Although what is herein referred to is a plurality of magnetic layers, they, in general, mostly have a two-layer structure comprised of an upper layer and a lower layer or a three-layer structure comprised of an upper layer and a lower layer between which an intermediate layer is interposed.

Whatever structure they have, it is required in the present invention that the temperature at which a magnetic layer that constitutes an uppermost layer shows a peak of its loss modulus is higher than the temperature at which a magnetic layer that constitutes a layer other than the uppermost layer shows a peak of its loss modulus.

The loss modulus ($E''$) of a magnetic layer as herein referred to is a measured value obtained by setting a sample in Leovibron DDV-EA-II (manufactured by Toyo Baldwin Co.), using as the sample a magnetic recording medium comprising a non-magnetic support, for example, a polyethylene terephthalate (PET) film, provided thereon with a magnetic layer. Conditions for the measurement can be exemplified as follows:

Frequency: 11 Hz
Rate of temperature rise: 2.0° C./min
Dimensions of sample: 2.00 cm in length, 0.40 cm in width
Temperature: 0° to 120° C.
Dynamic displacement: 16μ

Here, a complex elastic modulus (E) can be calculated from the following expression, by giving a constant amplitude ($\Delta L$) of a sinusoidal wave to one end of the sample and detecting a vibration load ($\Delta F$) at the other end thereof.

$$E = \frac{Lt}{S} \times \frac{\Delta F}{\Delta L}$$

$Lt$: Length of sample
$S$: Cross-sectional area
$\Delta L$: Dynamic displacement
$E'' = E\sin\delta$ The above measured values can be plotted as a graph. As shown in FIG. 1, a curve having two peaks $E_1''$ and $E_2''$ is obtained. Of these, the peak $E_1''$ on the side of a higher temperature corresponds to the peak of the non-magnetic support (PET), and the peak $E_2''$ on the side of a lower temperature corresponds to the peak of the magnetic layer.

The loss modulus of each of magnetic layers to be coated in multi-layers in the recording medium of the present invention is separately determined in this way using a sample having singly coated magnetic layer, and the temperature at which an uppermost magnetic layer shows a peak of its loss modulus must be higher than the temperature at which a magnetic layer other than the uppermost layer shows a peak of its loss modulus.

Such layer constitution makes it possible to prevent the uppermost layer to be peeled because of its contact with a head in the course of travel, and to readily apply calendering to a layer other than that, e.g., a lowermost layer, so that the layer surface becomes smooth and therefore the lumi. S/N can be improved.

In addition, the adhesion to a non-magnetic support can be strengthened, and hence the magnetic layers may be hardly peeled.

In the present invention, the temperature at which each of the plural magnetic layers shows a peak of its loss modulus must be not lower than 50° C., and particularly from 60° to 70° C.

Satisfaction of this condition makes it possible to maintain travel durability of a magnetic recording medium particularly under conditions of high temperature and high humidity.

If on the other hand the above temperature is lower than 50° C., no intended effect can be often achieved.

It is additionally required in the present invention that the half-width of a loss modulus-temperature curve showing a peak of the loss modulus of each coating film that constitutes said plurality of magnetic layers is not larger than 20° C.

This will be explained with reference to FIG. 1. The part indicated by $E_3''$ corresponds to the half-width. When the half-width is not larger than 20° C., the peak is considerably sharp. Such a sharp peak means in other words that the degree of cross-linking between ferromagnetic powder and binder is great in a magnetic layer.

Namely, the satisfaction of conditions concerning this half-width results in an increase in the above degree of cross-linking to improve the strength of a magnetic layer and at the same time brings about an improvement in the dispersibility of ferromagnetic powder, so that electromagnetic conversion characteristics, in particular, output can be improved.

If on the other hand the above half-width is larger than 20° C., no intended effect can be often achieved.

The ferromagnetic powder that can be used in the present invention includes, for example, fine ferromagnetic metal powders such as Co-containing $\gamma$-Fe$_2$O$_3$, Co-containing Fe$_3$O$_4$, Co-containing FeOx (4/3 < X < 3/2) powder, Fe—Al metal powder, Fe—Ni metal powder, Fe—Al—Ni metal powder, Fe—Al—P metal powder, Fe—Ni—Si—Al metal powder, Fe—Ni—Si—Al—Mn metal powder, Ni—Co metal powder, Fe—Mn—Zn metal powder, Fe—Ni—Zn metal powder, Fe—Co—Ni—Cr metal powder, Fe—Co—Ni—P metal powder, Co—Ni metal powder and Co—P metal powder. Of these, preferred is fine Co-containing $\gamma$-Fe$_2$O$_3$ powder.

The ferromagnetic powder used in the present invention may have a BET value of usually not less than 35 m$^2$/g, and preferably from 40 to 80 m$^2$/g.

There are no particular limitations on the form of the above ferromagnetic powder so long as it is fine. For example, it is possible to use any powders of an acicular, spherical or ellipsoidal form.

In the present invention, it is preferred to use as a binder a polyurethane having a negative functional group as described below.

The polyurethane having a negative functional group includes a polyurethane having at least one of —SO$_3$M$^1$, —SO$_2$M$^1$, —OSO$_3$M$^1$, and

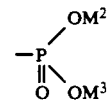

wherein M$^1$ represents a hydrogen atom or an alkali metal atom, and M$^2$ and M$^3$ each represent a hydrogen atom, an alkali metal atom or an alkyl group. M$^2$ and M$^3$ may be the same or different.

The above polyurethane having a negative functional group may have a molecular weight of usually from 2,000 to 70,000, and preferably from 4,000 to 50,000.

In the case when the above polyurethane having a negative functional group, it may be mixed in an amount of usually from 2 to 15 parts by weight, and preferably from 3 to 10 parts by weight, based on 100 parts by weight of the ferromagnetic powder.

In the present invention, the above polyurethane having a negative functional group may be used in combination with a curing agent of a polyisocyanate type, whereby it is also possible to improve the durability of a magnetic layer.

This curing agent of a polyisocyanate type, it is possible to use any of those which has been conventionally used as curing agents, as exemplified by a bifunctional isocyanate such as tolylene diisocyanate, diphenylmethane diisocyanate or hexane diisocyanate, a trifunctional isocyanate such as Colonate L (trade name; a product of Nippon Polyurethane Industry Co., Ltd.) or Desmodule L (trade name; a product of Bayer Japan Ltd.), and a urethane prepolymer containing isocyanate groups at the both terminals, or polyisocyanates usable as curing agents.

The above curing agent may be used in an amount of usually of from 5 to 80 parts by weight based on the total amount of the curing agents.

In the present invention, the binder may not be limited to the above polyurethane having a negative functional group, and it is also possible to use a thermoplastic resin, a thermosetting resin, a reactive resin, an electron irradiation curable resin, or a mixture of any of these, which have been hitherto used in magnetic recording mediums.

The above thermoplastic resin includes, for example, a polyurethane vinyl chloride/vinyl acetate copolymer, a vinyl chloride/vinylidene chloride copolymer, a vinyl chloride/acrylonitrile copolymer, an acrylate/acrylonitrile copolymer, an acrylate/vinylidene chloride copolymer, a methacrylate/vinylidene chloride copolymer, a methacrylate/ethylene copolymer, polyvinyl fluoride, a vinylidene/acrylonitrile copolymer, an acrylonitrile/butadiene copolymer, a polyamide resin, polyvinyl butyral, cellulose derivatives such as cellulose acetate/butylate, cellulose diacetate, cellulose triacetate, cellulose propionate and nitrocellulose, a styrene/butadiene copolymer, polyester resins, a chlorovinyl ether/acrylic ester copolymer, amino resins, and thermoplastic resins of a synthetic rubber type.

These may be used alone or may be used in combination of two or more kinds.

The above thermosetting resin or reactive resin includes, for example, phenol resins, epoxy resins, polyurethane curable resins, urea resins, melamine resins, alkyd resins, silicone resins, acrylic reactive resins, a mixture of a high-molecular polyester resin and an isocyanate prepolymer, a mixture of a methacrylate copolymer and a diisocyanate prepolymer, urea formaldehyde resins, and polyamide resins.

These may be used alone or may be used in combination of two or more kinds.

The above electron irradiation curable resin include, for example, unsaturated prepolymers of a maleic anhydride type, a urethane acrylic type, an epoxy acrylic type, polyester acrylic type, a polyether acrylic type, polyurethane acrylic type, and polyamide acrylic type; and polyfunctional monomers such as an ether acrylic type, a urethane acrylic type, an epoxy acrylic type, a phosphoric acid ester acrylic type, an aryl type, and a hydrocarbon type.

These may be used alone or may be used in combinations of two or more types.

These binders may be used in an amount of usually from 1 to 10 parts by weight based on 100 parts by weight of the ferromagnetic powder.

In the present invention, the polyurethane having a negative functional group and a conventional binder can be used in combination. In that instance, their mixing proportion may be usually from 9:1 to 1:9, and preferably from 8:2 to 2:8, in weight ratio of the polyurethane having a negative functional group to a conventional binder.

As a dispersant, which is an optional component in the present invention, an agent as exemplified by lecithin, a fatty acid, an amine compound, an alkyl sulfate, a fatty acid amide, a higher alcohol, a polyethylene oxide, a sulfosuccinic acid, a sulfosuccinic acid ester, a known surface active agent, or a salt of any of these, a polymer dispersant containing a salt of a negative organic group (e.g. —COOH or —PO$_3$H) can be added to the magnetic layer. These may be used alone or may be used in combination of two or more kinds.

In the present invention, of the above dispersants, lecithin can be preferably used.

The above dispersant may be added in an amount of usually not more than 10 parts by weight, and preferably not more than 3 parts by weight, based on 100 parts by weight of the ferromagnetic powder.

As a plasticizer, which is an optional component in the present invention, a fatty acid ester can be added to the magnetic layer. Such a fatty acid ester includes, for example, oleyl oleate, oleyl stearate, isocetyl stearate, dioleyl maleate, butyl stearate, butyl palmitate, butyl myristate, octyl myristate, octyl palmitate, amyl stearate, amyl palmitate, stearyl stearate, lauryl oleate, octyl oleate, isobutyl oleate, ethyl oleate, isotridecyl oleate, 2-ethylhexyl stearate, 2-ethylhexyl myristate, ethyl stearate, 2-ethylhexyl palmitate, isopropyl palmitate, isopropyl myristate, butyl laurate, cetyl-2-ethylhexalate, dioleyl adipate, diethyl adipate, diisobutyl adipate, and diisodecyl adipate. Of these, particularly preferred are butyl stearate and butyl palmitate.

The above various fatty acid esters may be used alone or may be used in combination of two or more kinds.

In the present invention, the above fatty acid ester may be added in an amount of usually from 0.5 to 10 parts by weight, and preferably from 1 to 5 parts by weight, based on 100 parts by weight of the ferromagnetic powder described above.

The addition of the dispersant such as a fatty acid and the plasticizer such as a fatty acid ester in smaller amounts makes it possible to improve travel durability of the magnetic recording medium under conditions of high temperature and high humidity.

The magnetic layer in the magnetic recording medium of the present invention may contain a lubricant.

The lubricant includes, for example, lubricants of a silicone type, lubricants of a fatty acid modified silicone type, lubricants of a fluorine type, liquid paraffin, squalane, carbon black, graphite, carbon black graft polymer, molybdenum disulfide, and tungsten disulfide.

These may be used alone or may be used in combination of two or more kinds.

The above lubricant may be mixed in an amount of usually not more than 20 parts by weight, and preferably not more than 10 parts by weight, based on 100 parts by weight the ferromagnetic powder described above.

In addition to the above various components, the magnetic layer may further contain an abrasive and an antistatic agent.

The above antistatic agent or the dispersant as described later has not only a single action. For example, a compound may often act as a lubricant and an antistatic agent.

Thus, the classification set out above in the present invention is based on the main action of a compound, and the action of a compound thus grouped is by no means limited to the action as noted in the classification.

The temperature at which a magnetic layer shows a peak of its loss modulus can be made higher by use of a resin having a higher glass transition point, a higher molecular weight or a higher cohesive energy. On the other hand, the temperature of the peak is lowered by addition of low molecular compound such as the forementioned dispersant or fatty acids or its esters. Further, as forementioned, the half-width of the curve showing the peak of loss modulus relates to dispersity of magnetic particles in the magnetic layer and narrower half-width corresponds to higher dispersity of the particles. Therefore, the half-width can be narrowed by use of a binder having an anionic functional group or a dispersant for raising dispersity of the magnetic particles. Therefore, the temperature of the loss modulus peak and the half-width of loss modulus-temperature curve of the magnetic component layer can be adjusted to the required value of the invention by selection of kinds and combining ratio of binder resins and control of adding amount of low molecular compound such as a dispersant.

Non-magnetic support

Materials for forming the non-magnetic support on which the above plurality of magnetic layers are laminated may include, for example, polyesters such as polyethylene terephthalate and polyethylene-2,6-naphthalate, polyolefines such as polypropylene, cellulose derivatives such as cellulose triacetate and cellulose diacetate, and plastics such as polycarbonate. In addition, metals such as Cu, Al and Zn, all sorts of ceramics such as what is called new ceramics, as exemplified by boron nitride and silicon carbide, can be used.

There are no particular limitations on the form of the non-magnetic support. It may be in the form of a tape, a sheet, a card, a disk, a drum or the like, any of which may be used. Various materials can be used by selecting them depending on the form and also as occasion demands.

The support may have a thickness of usually from 3 to 100 μm, and preferably from 5 to 50 μm, in the case of a tape or a sheet form. In the case of a disk or a card, it may have a thickness of usually from 30 to 100 μm. In the case of a drum, the support can be made to have the form of a cylinder, corresponding to a recorder to be used.

The surface of the non-magnetic support on which the above magnetic layers are not provided (i.e., the back surface) may be provided with a back coat layer for the purposes of improving travel performance of the magnetic recording medium, preventing electrostatic charge, and preventing transfer.

The surface of the non-magnetic support on which the above magnetic layers are provided may be provided with an intermediate layer as exemplified by an adhesive layer, for the purpose of improving the adhesion between the magnetic layers and the non-magnetic support.

Methods of manufacturing the magnetic recording medium of the present invention will be described below.

Manufacturing method

The magnetic recording medium of the present invention can be manufactured by preparing a magnetic coating composition obtained by kneading and dispersing magnetic layer components such as the ferromagnetic powder and the polyurethane having an anionic functional group, in a solvent, and thereafter coating the above non-magnetic support with the resulting magnetic coating composition, followed by drying.

The solvent that can be used in kneading and dispersing the magnetic layer components includes ketones such as acetone, methyl ethyl ketone (MEK), methyl isobutyl ketone (MIBK), and cyclohexanone; alcohols such as methanol, ethanol, propanol, and butanol; esters such as methyl acetate, ethyl acetate, butyl acetate, ethyl lactate, propyl acetate, and ethylene glycol monoacetate; ethers such as diethylene glycol dimethyl ether, 2-ethoxy ethanol, tetrahydrofuran, and dioxane; aromatic hydrocarbons such as benzene, toluene, and xylene; and halogenated hydrocarbons such as methylene chloride, ethylene chloride, carbon tetrachloride, chloroform, ethylene chlorohydrin, and dichlorobenzene.

When the components of the magnetic coating composition are kneaded into a composition, the above ferromagnetic powder and other components of the magnetic coating composition (hereinafter often "materials") are simultaneously or individually successively put in a kneader. For example, the above ferromagnetic powder is added to a solution containing a dispersant, and the mixture is kneaded for a given time, followed by addition of the remaining components, and the kneading is further continued to make up a magnetic coating composition.

When the materials are kneaded and dispersed, all sorts of kneaders can be used. Such kneaders include a twin-roll mill, a three-roll mill, a ball mill, a pebble mill, a sand grinder, a Sqebvari attritor, a high-speed impeller dispersion machine, a high-speed stone mill, a high-speed impact mill, a disperser, a kneader, a high-speed mixer, a homogenizer, and an ultrasonic dispersion machine.

A coating solution thus prepared, comprising the components for the formation of a magnetic layer, may be applied to the non-magnetic support by a known coating method.

The coating method that can be utilized in the present invention includes, for example, gravure roll coating, Mayer bar coating, doctor blade coating, reverse roll coating, dip coating, air knife coating, calender coating, squeegee coating, kiss coating, and fountain coating.

The magnetic layer thus formed by coating may have a dry coating thickness of from 0.1 to 5 $\mu$m, and particularly from 0.2 to 4 $\mu$m, in respect of the magnetic layer of an uppermost layer, and usually from 1 to 6 $\mu$m in total dry coating thickness of all magnetic layers.

After the components for the formation of magnetic layers have been coated in this way, the support with coatings is optionally subjected to magnetic field orientation in an undried state, and then usually further subjected to surface smoothing by the use of a super calender roll or the like.

Subsequently, the support with coatings thus treated is cut into the desired form, and a magnetic recording medium can be thus obtained.

The magnetic recording medium of the present invention, when, form example, cut into a continuous form, can be used as a magnetic tape such as a video tape or an audio tape. When cut into a disk, it can be used as a floppy disk or the like. It can also be used in the form of a card or a cylinder, like usual magnetic recording mediums.

EXAMPLES

The present invention will be described below in greater detail by giving Examples and Comparative Examples. In the following, "part(s)" refers to "parts by weight".

The method for measurement of physical properties as employed in Examples and Comparative Examples are as described below.

(a) RF output, lumi. S/N

Using a noise meter #925C, manufacture by Shibasoku, the values were expressed in terms of values (dB) with respect to those of FUJI S-Master, a tape manufactured by Fuji Photo Film Co., on a deck HR-S7000, manufactured by JVC.
RF output: 7 MHz
Lumi. S/N: 7 MHz (b) Dropout increase In respect of dropouts greater than 15 $\mu$s and $-12$ dB occurred when a tape was traveled on a deck HR-S7000 for 100 hours under conditions of 40° C. and 80% RH, an instance in which the initial dropouts became more numerous than the initial ones was evaluated as C; and an instance in which there was no increase, as A. Number of dropouts greater than 15 $\mu$s and $-12$ dB in the reproduced signal was counted for 1 minute as dropout.

(c) Shed

Ranks of head contamination occurred when a tape was traveled for 100 hours under conditions of 40° C. and 80% RH were evaluated. An instance in which the head was not contaminated was evaluated as A; an instance in which it was a little contaminated, as B; an instance in which it was contaminated, as C; and an instance in which it was seriously contaminated, as D.

(d) Edge damage

A tape having been traveled for 100 hours was examined. An instance in which an edge of the tape was broken was evaluated as C; and an instance in which no edge was broken, as A.

(e) Squareness ratio

Using a vibrating sample magnetometer manufactured by Toei Kogyo K.K., the residual magnetic flux density/saturated magnetic flux density (Hm=5 KOe) was determined.

EXAMPLE 1

The uppermost layer materials and lowermost layer materials as shown below were each throughly mixed with stirring using a ball mill. To each resulting mixture, 5 parts of a polyfunctional isocyanate (Colonate L; a product of Nippon Polyurethane Industry Co., Ltd.) was added, and the mixture was filtered with a filter having an average pore size of 1 μm. An uppermost layer magnetic coating composition and a lowermost layer magnetic coating composition were thus prepared.

| Uppermost layer materials | |
|---|---|
| Co-containing $\gamma$-$Fe_2O_3$ powder (BET value: 49 $m^2$/g; Hc: 850 Oe) | 100 parts |
| Polyurethane A (comprising 4,4'-diphenylmethane diisocyanate, 1,4-butanediol and adipic acid; Tg: 10° C.; molecular weight: 30,000) | 10 parts |
| Vinyl chloride/vinyl acetate copolymer A (degree of polymerization: 350) | 15 parts |
| Alumina powder | 5 parts |
| Carbon black | 3 parts |
| Myristic acid | 1 part |
| Stearic acid | 1 part |
| Butyl palmitate | 2 parts |
| Cyclohexanone | 100 parts |
| Methyl ethyl ketone | 150 parts |
| Lowermost layer materials | |
| Co-containing $\gamma$-$Fe_2O_3$ powder (BET value: 43 $m^2$/g; Hc: 650 Oe) | 100 parts |
| Polyurethane C (comprising tolylene diisocyanate, neopentane diisocyanate and adipic acid; Tg: −5° C.; molecular weight: 30,000) | 10 parts |
| Vinyl chloride/vinyl acetate copolymer B degree of polymerization: 300) | 15 parts |
| Myristic acid | 1 part |
| Stearic acid | 1 part |
| Butyl palmitate | 2 parts |
| Cyclohexanone | 100 parts |
| Methyl ethyl ketone | 150 parts |

Next, using the above lowermost layer magnetic coating composition and uppermost layer magnetic coating composition, the coating compositions were successively applied to a 14 μm thick, broad polyethylene terephthalate film so as to give dry coating thicknesses of 3.0 μm for the lowermost layer and 0.5 μm for the uppermost layer, followed by drying.

Subsequently, this film comprised of the two layers was treated using a super calender roll at 70° C. and 300 kg/$cm^2$, and the film thus treated was cut into a tape with a width of ½ inch. A magnetic tape was thus prepared. Characteristics of this magnetic tape were measured to obtain the results as shown in Tables 2 and 3.

EXAMPLE 2, COMPARATIVE EXAMPLES 1, 3, 6, 8, 10, 12

Magnetic tapes were prepared in the same manner as in Example 1 except that the materials as shown in Table 1 were used in the mixing proportions also shown in Table 1. Their characteristics were also measured in the same manner to obtain the results as shown in Tables 2 and 3.

EXAMPLE 3

Uppermost layer materials of the same kinds and in the same amounts as in Example 1 except that the polyurethane A was replaced with a polyurethane B (comprising 4,4-diphenylmethane diisocyanate, 1,4-butanediol and adipic acid, containing 0.05 mmol/g of an anionic functional group —$SO_3Na$, and having a Tg of 0° C. and a molecular weight of 30,000), and the following intermediate layer materials and lowermost layer materials were each thoroughly mixed with stirring using a ball mill. To each resulting mixture, 5 parts of a polyfunctional isocyanate (Colonate L; a product of Nippon Polyurethane Industry Co., Ltd.) was added, and the mixture was filtered with a filter having an average pore size of 1 μm. An uppermost layer magnetic coating composition, an intermediate magnetic coating composition and a lowermost layer magnetic coating composition were thus prepared.

| Intermediate layer materials | |
|---|---|
| Co-containing $\gamma$-$Fe_2O_3$ powder (BET value: 43 $m^2$/g; Hc: 650 Oe) | 100 parts |
| Polyurethane A | 10 parts |
| Vinyl chloride/vinyl acetate copolymer A | 15 parts |
| Myristic acid | 1 part |
| Butyl palmitate | 2 parts |
| Cyclohexanone | 100 parts |
| Methyl ethyl ketone | 150 parts |
| Lowermost layer materials | |
| Co-containing $\gamma$-$Fe_2O_3$ powder (BET value: 40 $m^2$/g; Hc: 650 Oe) | 100 parts |
| Polyurethane C (comprising tolylene diisocyanate, neopentane diisocyanate and adipic acid; Tg: −5° C.; molecular weight: 30,000) | 10 parts |
| Vinyl chloride/vinyl acetate copolymer B | 15 parts |
| Myristic acid | 2 parts |
| Stearic acid | 1 part |
| Butyl palmitate | 1 part |
| Lecithin | 2 parts |
| Cyclohexanone | 100 parts |
| Methyl ethyl ketone | 150 parts |

Next, using the above lowermost layer magnetic coating composition, intermediate layer magnetic coating composition and uppermost layer magnetic coating composition, the coating compositions were successively applied to a 14 μm thick polyethylene terephthalate film so as to give dry coating thicknesses of 2.5 μm for the lowermost layer, 1.0 μm for the intermediate layer and 0.5 μm for the uppermost layer, followed by drying.

Subsequently, using this film comprised of the three layers, a magnetic tape was obtained in the same manner as in Example 1.

Characteristics of this magnetic tape were measured to obtain the results as shown in Tables 2 and 3.

EXAMPLE 4, COMPARATIVE EXAMPLES 2, 4, 5, 7, 9, 11, 13

Magnetic tapes were prepared in the same manner as in Example 1 except that the materials as shown in Table 1 were used in the mixing proportions also shown in Table 1. Their charateristics were also measure in the same manner to obtain the results as shown in Tables 2 and 3.

TABLE 1

| | Example | | | | Comparative Example | | | | | | | | | | | | |
|---|---|---|---|---|---|---|---|---|---|---|---|---|---|---|---|---|---|
| | 1 | 2 | 3 | 4 | 1 | 2 | 3 | 4 | 5 | 6 | 7 | 8 | 9 | 10 | 11 | 12 | 13 |
| Uppermost layer: | | | | | | | | | | | | | | | | | |
| Polyurethane A | 10 | 0 | 0 | 0 | 10 | 0 | 0 | 0 | 0 | 0 | 0 | 0 | 0 | 10 | 0 | 0 | 10 |
| Polyurethane B | 0 | 10 | 10 | 0 | 0 | 0 | 10 | 0 | 0 | 10 | 10 | 0 | 0 | 10 | 10 | 0 | 0 |
| Polyurethane C | 0 | 0 | 0 | 0 | 0 | 10 | 0 | 0 | 10 | 0 | 0 | 10 | 0 | 0 | 0 | 10 | 0 |
| Polyurethane D | 0 | 0 | 0 | 10 | 0 | 0 | 0 | 10 | 0 | 0 | 0 | 0 | 0 | 0 | 0 | 0 | 0 |
| PVC-PVAc* A | 15 | 0 | 15 | 0 | 0 | 0 | 0 | 15 | 0 | 15 | 15 | 0 | 0 | 0 | 0 | 0 | 0 |
| PVC-PVAc* B | 0 | 15 | 0 | 15 | 15 | 15 | 15 | 0 | 15 | 0 | 0 | 10 | 10 | 15 | 15 | 8 | 8 |
| Myristic acid | 1 | 1 | 1 | 1 | 1 | 1 | 1 | 1 | 1 | 1 | 1 | 2 | 2 | 1 | 1 | 2 | 2 |
| Stearic acid | 1 | 1 | 1 | 1 | 1 | 1 | 1 | 1 | 1 | 1 | 0 | 2 | 2 | 1 | 1 | 3 | 3 |
| Butyl palmitate | 2 | 2 | 2 | 2 | 2 | 2 | 2 | 2 | 2 | 2 | 2 | 3 | 3 | 2 | 2 | 3 | 3 |
| Lecithin | 0 | 0 | 0 | 0 | 0 | 0 | 1 | 0 | 1 | 0 | 0 | 0 | 0 | 0 | 0 | 2 | 2 |
| Intermediate layer: | | | | | | | | | | | | | | | | | |
| Polyurethane A | — | — | 10 | 0 | — | 10 | — | 0 | 0 | — | 0 | — | 0 | — | 0 | — | 0 |
| Polyurethane B | — | — | 0 | 10 | — | 0 | — | 0 | 0 | — | 10 | — | 10 | — | 0 | — | 0 |
| Polyurethane C | — | — | 0 | 10 | — | 0 | — | 10 | 0 | — | 0 | — | 0 | — | 10 | — | 0 |
| Polyurethane D | — | — | 0 | 0 | — | 0 | — | 0 | 10 | — | 0 | — | 0 | — | 0 | — | 10 |
| PVC-PVAc* A | — | — | 15 | 0 | — | 15 | — | 0 | 0 | — | 0 | — | 0 | — | 0 | — | 0 |
| PVC-PVAc* B | — | — | 0 | 15 | — | 0 | — | 15 | 10 | — | 15 | — | 15 | — | 10 | — | 15 |
| Myristic acid | — | — | 1 | 1 | — | 1 | — | 1 | 2 | — | 2 | — | 2 | — | 2 | — | 2 |
| Stearic acid | — | — | 1 | 1 | — | 0 | — | 1 | 2 | — | 2 | — | 3 | — | 3 | — | 1 |
| Butyl palmitate | — | — | 2 | 2 | — | 0 | — | 2 | 3 | — | 2 | — | 3 | — | 3 | — | 2 |
| Lecithin | — | — | 0 | 1 | — | 0 | — | 2 | 2 | — | 1 | — | 3 | — | 3 | — | 2 |
| Lowermost layer: | | | | | | | | | | | | | | | | | |
| Polyurethane A | 0 | 0 | 0 | 0 | 10 | 0 | 0 | 0 | 0 | 0 | 10 | 0 | 0 | 0 | 0 | 0 | 0 |
| Polyurethane B | 0 | 0 | 0 | 0 | 0 | 0 | 0 | 0 | 0 | 0 | 0 | 10 | 10 | 0 | 0 | 0 | 10 |
| Polyurethane C | 10 | 0 | 10 | 0 | 0 | 10 | 0 | 0 | 0 | 10 | 0 | 0 | 0 | 10 | 10 | 0 | 0 |
| Polyurethane D | 0 | 10 | 0 | 10 | 0 | 0 | 10 | 10 | 10 | 0 | 0 | 0 | 0 | 0 | 0 | 10 | 0 |
| PVC-PVAc* A | 0 | 0 | 0 | 0 | 15 | 0 | 0 | 0 | 0 | 0 | 0 | 0 | 0 | 8 | 0 | 0 | 0 |
| PVC-PVAc* B | 15 | 15 | 15 | 8 | 0 | 15 | 10 | 5 | 5 | 15 | 8 | 15 | 0 | 10 | 8 | 15 | 10 |
| Myristic acid | 1 | 1 | 2 | 2 | 1 | 1 | 2 | 2 | 2 | 2 | 2 | 2 | 2 | 2 | 2 | 2 | 2 |
| Stearic acid | 1 | 1 | 1 | 2 | 0 | 0 | 2 | 1 | 1 | 2 | 2 | 2 | 2 | 3 | 2 | 1 | 1 |
| Butyl palmitate | 2 | 2 | 1 | 1 | 0 | 1 | 3 | 1 | 1 | 3 | 3 | 2 | 1 | 3 | 3 | 1 | 2 |
| Lecithin | 0 | 1 | 2 | 2 | 0 | 0 | 2 | 2 | 2 | 2 | 2 | 2 | 2 | 3 | 2 | 2 | 1 |

Notes:
Polyurethane A: A polyurethane comprising 4,4'diphenylmethane diisocyanate (MDI), 1,4-butanediol (1,4-BD) and adipic acid (ADA), with a Tg of 10° C. and a molecular weight of 30,000.
Polyurethane B: A polyurethane comprising MDI, 1,4-BD and ADA, containing 0.05 mmol/g of an —SO₃Na group, with a Tg of 0° C. and a molecular weight of 30,000.
Polyurethane C: A polyurethane comprising tolylene diisocyanate (TDI), neopentane diisocyanate (NPG) and ADA, with a Tg of −5° C. and a molecular weight of 30,000.
Polyurethane D: A polyurethane comprising TDI, NPG and ADA, containing 0.05 mmol/g of an —SO₃ group, with a Tg of −5° C. and a molecular weight of 30,000.
*Vinyl chloride/vinly acetate copolymer A: Degree of polymerization: 350*
*Vinyl chloride/vinly acetate copolymer B: Degree of polymerization: 300*

TABLE 2

| | Uppermost layer | | Intermed. layer | | Lowermost layer | |
|---|---|---|---|---|---|---|
| | Peak temp. (°C.) | Half-width (°C.) | Peak temp. (°C.) | Half-width (°C.) | Peak temp. (°C.) | Half-width (°C.) |
| Example: | | | | | | |
| 1 | 70 | 10 | — | — | 66 | 12 |
| 2 | 68 | 5 | — | — | 62 | 10 |
| 3 | 73 | 8 | 68 | 11 | 60 | 12 |
| 4 | 70 | 8 | 65 | 12 | 54 | 18 |
| Comparative Example: | | | | | | |
| 1 | 60 | 12 | — | — | 70 | 5 |
| 2 | 61 | 12 | 72 | 6 | 62 | 8 |
| 3 | 62 | 13 | — | — | 48 | 18 |
| 4 | 63 | 10 | 61 | 12 | 47 | 17 |
| 5 | 61 | 14 | 46 | 18 | 47 | 18 |
| 6 | 65 | 10 | — | — | 60 | 21 |
| 7 | 68 | 8 | 62 | 18 | 60 | 22 |
| 8 | 67 | 21 | — | — | 60 | 18 |
| 9 | 68 | 22 | 60 | 15 | 60 | 16 |
| 10 | 65 | 10 | — | — | 57 | 22 |
| 11 | 65 | 10 | 57 | 23 | 55 | 28 |
| 12 | 47 | 26 | — | — | 62 | 18 |
| 13 | 55 | 28 | 60 | 16 | 62 | 16 |

TABLE 3

| | RF output (dB) | Lumi. S/N (dB) | Dropout increase | Shed | Edge damage | Squareness ratio |
|---|---|---|---|---|---|---|
| Example: | | | | | | |
| 1 | +0.7 | +0.9 | A | A | A | 0.85 |
| 2 | +0.8 | +1.0 | A | A | A | 0.86 |
| 3 | +0.6 | +0.8 | A | A | A | 0.87 |
| 4 | +0.8 | +0.9 | A | A | A | 0.85 |
| Comparative Example: | | | | | | |
| 1 | +0.7 | +0.8 | C | C | A | 0.82 |
| 2 | +0.7 | +0.8 | C | D | A | 0.82 |

TABLE 3-continued

| | RF output (dB) | Lumi. S/N (dB) | Dropout increase | Shed | Edge damage | Squareness ratio |
|---|---|---|---|---|---|---|
| 3 | +0.6 | +0.8 | C | D | C | 0.83 |
| 4 | +0.8 | +1.0 | Travel-stop in 80 hrs. | | | 0.84 |
| 5 | +0.6 | +0.7 | Travel-stop in 53 hrs. | | | 0.84 |
| 6 | +0.7 | +0.9 | C | D | C | 0.80 |
| 7 | +0.8 | +1.0 | C | D | C | 0.81 |
| 8 | +0.3 | +0.4 | C | D | A | 0.81 |
| 9 | +0.3 | +0.3 | C | D | C | 0.82 |
| 10 | +0.7 | +0.8 | A | C | C | 0.78 |
| 11 | +0.7 | +0.8 | Travel-stop in 62 hrs. | | | 0.78 |
| 12 | +0.1 | +0.2 | C | D | A | 0.81 |
| 13 | +0.1 | +0.1 | C | D | A | 0.81 |

As will be evident from the results in the tables, the magnetic tapes according to Examples in which the loss modulus of the coating film that constitutes the magnetic layers is specified as in the present invention are endowed with superior electromagnetic conversion characteristics and travel durability, compared with Comparative Examples in which the same is not specified.

What is claimed is:

1. A magnetic recording medium comprising a nonmagnetic support and a plurality of magnetic layers thereon, each of said magnetic layers comprising a ferromagnetic powder and a binder, wherein
   each of said magnetic layers shows a peak in its loss modulus-temperature curve at a peak temperature of at least 50° C., and said peak having a half-width not larger than 20° C.; and
   said peak of an outermost of said magnetic layers is at a higher said peak temperature than that of a magnetic layer other than said outermost magnetic layer.

2. The recording medium of claim 1 wherein each of said magnetic layers has said peak at 60° C. to 70° C.

3. The recording medium of claim 1 wherein said binder is a polyurethane resin having an anionic functional group.

4. The recording medium of claim 3 wherein said anionic functional group is selected from $-SO_3M^1$, $-OSO_2M^1$, $-OSO_3M^1$, and

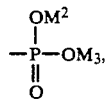

wherein $M^1$ is hydrogen or alkali metal, and $M^2$ and $M^3$ are individually hydrogen, alkali metal, or alkyl.

5. The recording medium of claim 3 wherein said polyurethane resin has a molecular weight of 2,000 to 7,000.

* * * * *